Dec. 31, 1940. H. J. HENNESSY 2,226,862
HANDCUFF AND CHASSIS COMBINATION FOR POLICE CARS
Filed July 22, 1939

INVENTOR
Herbert J. Hennessy,
BY Louis M. Schmidt
ATTORNEY

Patented Dec. 31, 1940

2,226,862

UNITED STATES PATENT OFFICE 2,226,862

HANDCUFF AND CHASSIS COMBINATION FOR POLICE CARS

Herbert J. Hennessy, New Haven, Conn.

Application July 22, 1939, Serial No. 285,976

1 Claim. (Cl. 70—16)

My invention relates to improvements in handcuff and chassis combinations for police cars, such cars being variously designated as police radio cars, prowl cars and squad cars and all cars used in the maintenance of law and order, the combination comprising of a pair of handcuffs or a plurality thereof permanently secured to a rigid part of the chassis of such an automobile, preferably by means of a flexible connection so as to prevent the escape from the car of a prisoner who is otherwise secured by means of the handcuffs and the object of my improvement is to produce a handcuff and chassis combination for police cars that will provide means for safeguarding against the escape of such a prisoner and also by such means as will avoid serious damage to the car and consequent depreciation of the resale value thereof.

In the accompanying drawing, the views of which are all diagrammatic:

Figure 1:
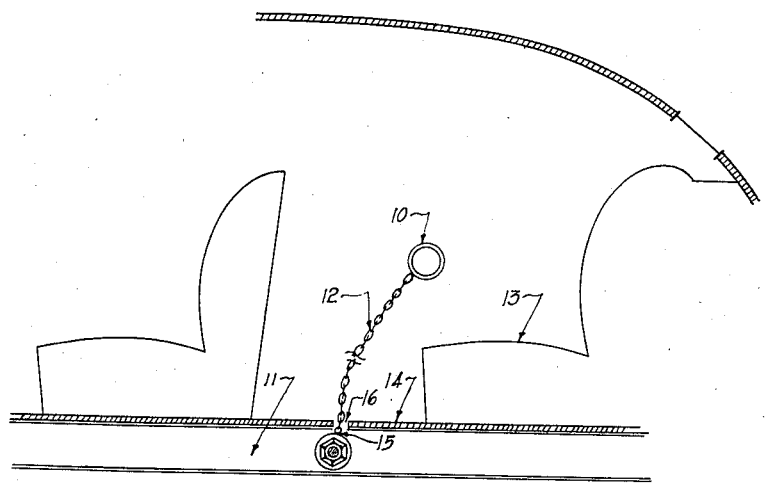
Figure 1 is a side elevation of part of an automobile chassis, with the opposed walls omitted showing my improved handcuff and chassis combination for police cars, the view being substantially restricted to the showing of a seat, part of the floor with a hole therein, a bar below the floor, handcuffs adjacent the seat, and a flexible connection.
Figure 2:
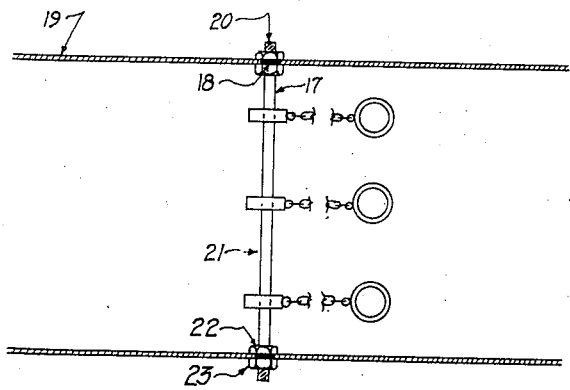
Fig. 2 is a plan view, showing a set of three handcuffs and associated members.
Figure 3:
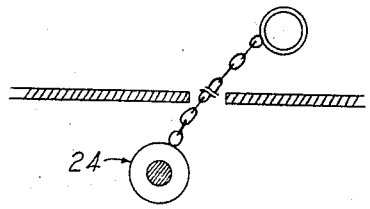
Fig. 3 is a side elevation with the holding nuts for the bar removed, disclosing a ring for the flexible connection on the bar.

My improved handcuff and chassis combination for police cars comprises, as shown, one or more pairs of handcuffs 10, each of which is secured to the chassis 11 of an automobile by means that may be regarded as substantially permanent, such means 12 being preferably flexible and may be of chain, as shown, or flexible steel cable.

The handcuffs are located near to and in operative relation to the seat 13 and thus above the floor 14.

The secured end portion 15 of the chain 12 is preferably located below the floor 14, the chain 12 being projected through an opening 16 in the floor 14.

Any ordinary means may be employed to secure the handcuffs to the chain.

Ordinary means may be likewise employed to secure the chain to the chassis. I prefer, however, the means to be described herewith:

A bar or rod or piece of pipe 17 transverses the full width of the car, being entered through suitable openings 18 in the sheet metal sides or side walls 19 of the chassis with projecting ends 20 on the outside and providing a relatively long free length of bar 21 intermediate the sides 19. The bar ends 20 are screw threaded and mounted thereon and opposed to the inside faces of the sides 19 are backing nuts 22. On the outer sides of the sides are the securing nuts 23.

On the free bar length 21 are mounted rings or collars 24 of metal corresponding in number to the number of handcuffs and the chains are individually attached thereto in any proper manner.

Thus the chain securing means are below the floor.

The chain 12 has an operative fit in the opening 16 in the floor 14.

The rings or collars 24, as shown, serve as enlargements of the chain structure and are larger in diameter than the opening 16 and thus by abutment with the walls or boundary structure of the opening serve to limit the upward movement of the chain structure in case the securing bar 17 were omitted.

I claim as my invention:

In a handcuff and chassis combination for police cars, a chassis having a floor and having side walls therebelow and separated by open space, said floor being provided with an opening, said side walls being provided with aligned openings, a chain and handcuff structure comprising a chain having an upper end above said floor, a lower end below said floor and handcuffs attached to said upper end, said chain being rove through said opening in the floor, a bar extending across said open space, having the ends respectively entered through said openings in the side walls, means for securing said bar ends, a plurality of rings slidably mounted on said bar, and one of said rings secured to said lower end of the chain.

HERBERT J. HENNESSY.